United States Patent Office 2,817,618
Patented Dec. 24, 1957

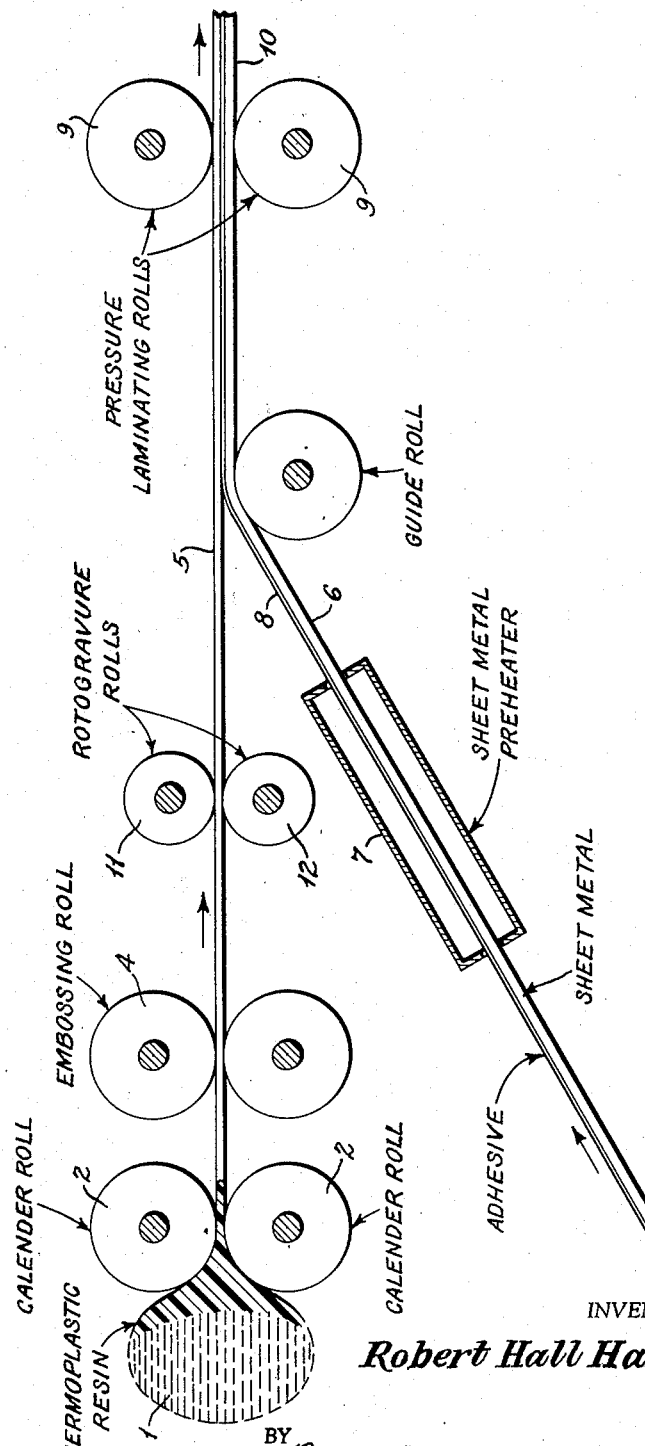

2,817,618

LAMINATES AND PROCESS FOR THE PRODUCTION THEREOF

Robert Hall Hahn, Winchester, Va.

Application February 14, 1957, Serial No. 640,269

25 Claims. (Cl. 154—102)

This invention relates to a method for producing laminated structures from thermoplastic resin and sheet metal laminae. More particularly, the invention relates to a method for the rapid and efficient production of thermoplastic resin-sheet metal laminates, the exposed surface of the resin laminae of which is provided with a desired physical finish such as embossing.

A wide variety of materials has been availed of in the manufacture of furniture, cabinets for air-conditioners, business machines, radios, technical instruments of various types, and similar devices. Painted or lacquered metal has been frequently utilized for this purpose. Such materials have proved objectionable in consequence of the relative ease with which the paint or lacquer is broken or worn off. Distortion or bending of coated metal surfaces is frequently sufficient to disrupt conventional coatings which are applied thereto.

Laminates of various synthetic resins and sheet metal would provide an excellent material for the fabrication of cabinets, furniture, and the like, provided the bond joining the laminae was sufficiently strong and provided an appropriate, sharply defined, physical finish such as an embossed pattern or a polished or matte surface could be formed on the exposed resin surface, the surface pattern being sufficiently permanent to resist the severe conditions to which such articles are subjected in use.

Prior art processes for the manufacture of metal-resin laminates in which the desired resin surface finish is imparted prior to the laminating step have proved unsatisfactory due to fading or loss of such finish during lamination.

Previously known methods for the economical continuous quantity production of embossed, thermoplastic resin-sheet metal laminates have yielded a product in which the embossed pattern is faded and lacking in definition. Such products are of limited utility and do not present strongly wear-resistant resin surfaces. Frequently in the laminated structures formed by such methods, the bond between the resin-metal laminae is too weak to permit feasible use thereof for many purposes.

Similarly, metal-resin laminates on which the exposed surface of the resin-lamina is provided with a printed design, such as a wood grain pattern, are most attractive when the resin surface is provided with a matte finish prior to the application of the design by rotogravure printing and the like. Previously known methods for producing laminates are objectionable in failing to preserve the desired resin surface finish during the laminating operation.

It is, therefore, a primary object of the invention to provide a process which can be practiced on a continuous basis for the production of thermoplastic resin-sheet metal laminae in which a desired physical surface finish is imparted to the exposed surface of the resin laminae prior to the laminating step.

It is an additional primary object of this invention to provide a method for the rapid and economical manufacture of embossed resin-metal laminates particularly suitable for the fabrication of furniture cabinets, chutes, automobile dashboards, and similar articles.

It is a further primary object of the invention to provide an economical method for the quantity production of thermoplastic resin-sheet metal laminates having a sharp, definitive, embossed pattern presenting a rugged, highly wear resistant surface in the thermoplastic resin laminae.

It is a further object of the invention to provide a method for the fabrication of thermoplastic resin-sheet metal laminates having a desired surface finish in the resin laminae characterized by a bond strength between the laminae of at least about 20 lbs. per linear inch.

It is a further object of this invention to provide a method for the continuous production of a thermoplastic resin-sheet metal laminate, the resin laminae of which has a desired physical finish on the exposed surface thereof.

It is a specific object of the invention to provide a method which embraces forming a thermoplastic resin-sheet metal laminate by applying thermoplastic sheet material to a preheated metal surface bearing an adhesive activated under the conditions.

It is an additional specific object of the invention to provide a method for manufacturing an embossed polyvinyl chloride sheet metal laminate in which the embossed pattern in the polyvinyl chloride lamina is sharp and definitive.

It is an additional object of the invention to provide a method for the production of dimensionally stable thermoplastic resin-metal laminates.

It is yet another object of the invention to provide a method which embraces imparting dimensional stability to thermoplastic resin-sheet metal laminates while concurrently improving the bond strength between the laminae.

The invention broadly embraces heating substantially uniformly throughout its thickness a sheet of thermoplastic resinous material to a temperature intermediate the softening temperature and the temperature at which the resinous material becomes fluid physically treating the so-heated sheet to impart a desired physical finish thereto, cooling the surface finished sheet to a temperature substantially below the finishing temperature and laminating the cooled, surface finished sheet with sheet metal preheated to a temperature of at least 100° F. but substantially below the finishing temperature of said resin sheet, said preheated sheet metal bearing an adhesive activated under the conditions.

In a preferred embodiment of the invention, an embossed or otherwise physically surface finished thermoplastic resin-sheet metal laminate is produced by calendering a thermoplastic resin to form a sheet of thermoplastic material having throughout a substantially uniform temperature of about 300° F. to about 400° F., surface finishing the so-formed sheet while still hot from the calendering step and before the sheet has cooled to a temperature below about 275° F., cooling the surface finished sheet, pressing the cooled, surface finished sheet to a metal surface preheated to a temperature of at least about 225° F. but substantially lower than the temperature of the thermoplastic sheet material in the surface finishing step, said metal surface bearing an adhesive activated under the conditions, and cooling the laminated structure so formed.

The combined calendering and surface finishing steps are important to the initial production in the thermoplastic resin laminae of the definitive, physical surface finishes such as embossing which characterize the laminated structure resulting from the invention.

A substantially uniform temperature throughout the thermoplastic resin sheet is requisite to insure uniform, sharply definitive, physical surface finishes, such as embossing, which will not fade or distort in the laminating process or after the final laminated structure has been formed. Substantial temperature differentials between the surfaces of the sheet material and the interior thereof existing at the precise time of the physical finishing step give rise to physical surface finishes, such as embossing, of poor quality which may tend to fade in the later steps of the process or after the final laminate has been placed in the hands of the ultimate consumer. It is within the scope of the invention, however, to flame treat or otherwise heat the surface of the sheet between a calendering and physical surface finishing step as long as the sheet temperature is substantially uniform at the precise time of the physical finishing operation.

Preferably, the thermoplastic resin sheet is substantially uniformly heated to a temperature of about 330° F. to about 380° F. but lower than the decomposition point of the resin, and physically surface finished before the temperature thereof has fallen below about 300° F. It will be appreciated that there is no true melting point of many resinous materials, including vinyl resins. The viscosity of such materials decreases with increased heat until the decomposition point is reached. It will be appreciated that the embossing or other surface finishing step is carried out at a temperature such that the material is characterized by sufficient viscosity to retain the embossed pattern, i. e., before the resinous material is essentially fluid. It will be further appreciated that resins having higher softening points may require use of temperatures higher than those above set forth as being preferred.

The thermoplastic resinous material may be formed into a sheet in any conventional calendering or extrusion apparatus, such as a rubber calender. The sheet may be calendered to any desired thickness, but normally will be characterized by a thickness within the range of about .003 inch to about .030 inch. The hot calendered or extruded sheet may be surface finished with conventional surface finishing apparatus, such as embossing rolls or plates, polish rolls or plates, matte finish rolls or plates, and the like. In a preferred form of the invention, the hot calendered or extruded sheet is passed through surface finishing, for example, embossing rolls spaced closely adjacent to the point at which the sheet is discharged from the calender or extrusion die.

To the end that the initial high quality of the physical surface finish may be preserved to the optimum degree in the final laminated structure and/or to promote handling ease with softer plastic stocks, the surface finished sheet is desirably cooled after the surface finishing step to a temperature below about 150° F. and preferably to room temperature. The cooled, surface finished thermoplastic sheet is thereafter laminated under pressure to a metal surface desirably preheated to a temperature of at least about 225° F., preferably at least about 265° F., but substantially lower than the temperature at which the thermoplastic sheet material was surface finished, the preheated metal surface bearing an adhesive which is activated under the conditions and effective to form a bond between the sheet metal and the thermoplastic resin sheet.

In general, it is preferred that the adhesive-bearing metal surface be preheated to a temperature at least about 10 degrees lower than the temperature of the thermoplastic resin sheet material when embossed or otherwise physically finished. A range of from about 10 to 20 degrees lower than the temperature of the thermoplastic sheet material when surface finished is suitable. If the temperature of the preheated metal sheet is not substantially lower than the temperature at which the thermoplastic resin laminae was surface finished, the surface finished pattern in the thermoplastic sheet material may fade in the laminating step.

All of the various thermoplastic resins may be employed in the practice of this invention. Specifically, materials including the various polymers or copolymers of vinyl acetate, vinyl chloride, vinylidene chloride, vinyl butyral, polyethylene, acrylonitrile, styrene, butadiene, cellulose esters such as cellulose acetate and cellulose nitrate, halogenated rubber, and the like materials can be employed. Polyvinyl chloride is the preferred homopolymer. Copolymers of styrene with butadiene and/or acrylonitrile are preferred copolymers.

Any desired physical surface finish can be imparted to the exposed surface of the thermoplastic resin laminae by the method of this invention. Embossed patterns of all types, various matte finishes, highly polished surfaces and the like are contemplated. This invention contemplates the provision of a physical surface finish or design different from that resulting from the conventional calendering operation. The desired physical surface finish or design is imparted in conventional manner by suitable finishing rolls such as embossing rolls, matte finish rolls and the like.

All conventional metals and alloys may be employed as the metal lamina in the fabrication of the laminated structures of this invention. Sheet metals including steel, stainless steel, aluminum, tin, copper, bronze, brass, iron, zinc and others can be employed. The metal may be employed in the form of individual sheets or supplied from a continuous roll. The metal should be free of dirt, grease, and like materials, which would adversely affect the bond between the laminae.

In the preferred form of the invention, the metal is cleaned by acid-etching. Conventional processes, such as Bonderizing which entails deposit of an inert phosphate coating on the cleaned metal surface, can be employed.

The adhesive composition which is employed in the invention is preferably of a thermoplastic nature and of such a character that it is activated under the conditions which exist in the laminating step. Preferably, such adhesives contain thermoplastic resinous components which are common with certain of the ingredients which are compounded into the thermoplastic sheet material in the calendering operation.

For convenience in application, such adhesives are customarily suspensions or solutions in volatile organic media, such as ketones, low boiling hydrocarbons, and the like, of a plurality of different thermoplastic resinous materials effective under the conditions to provide a bond of appropriate strength. Typical resinous and other components of such adhesives, include vinyl chloride polymers, copolymers, and terpolymers, vinylidene chloride polymers, dioctyl phthalate, toluol, methyl ethyl ketone, methyl isobutyl ketone, and the like. Heat activated adhesive compositions containing thermosetting components may be employed if desired, including such materials as the neoprene cements.

A preferred adhesive composition consists essentially of a vinyl chloride-acetate copolymer resin solution with a ketone with a hydrocarbon additive to retard drying rate slightly. The following formulation is typical:

| | Percent by weight |
|---|---|
| Vinyl chloride-acetate copolymer resin | 20–30 |
| Alkyd type ester of balsamic rosin sold by Hercules Powder Co. as "Neolyn 23" | 5–10 |
| Dioctyl phthalate | 2– 5 |
| Toluol | 30–35 |
| Methyl ethyl ketone | 12–18 |
| Methyl isobutyl ketone | 12–18 |

The adhesive is preferably applied by spraying or roll coating the surface of the sheet metal, and thereafter voltatilizing the solvent remaining in the adhesive from the metal surface. This process is desirably repeated several times to form a suitable layer of solvent-free adhesive material.

It has been discovered that the thickness of the solvent-free adhesive layer on the preheated metal surface is of importance. More specifically, the adhesive layer on the metal surface should have a thickness of from about 0.2 to about 1.5 mils, preferably about 0.9 to about 1.1 mils. Substantial variations of this adhesive thickness may give rise to an inferior bond between the thermoplastic resinous sheet material and the metal lamina.

The bond strength between the resin and metal laminae of the laminated products of the invention can be improved by annealing of the finished lamina at an elevated temperature lower than the temperature at which the surface finish was imparted to the resin laminae. Preferably such annealing is effected by exposing the laminate to the desired temperature conditions for a period of at least about one minute, preferably for a period of about one to ten minutes.

It frequently is desirable to apply a protective coating to the exposed surface of the metal lamina of the laminates of the invention. In such cases the requisite baking or curing of the protective coating may be effected simultaneously with the annealing operation. The particular protective coating applied to the exposed metal surface of the laminate may comprise any appropriate paint or other coating composition.

It will be appreciated by those skilled in the art that the invention contemplates that any desired compounding ingredients can be incorporated into the thermoplastic sheet material in the calendering step. Pigments, extenders, stabilizers, plasticizers, and the like, can be included. The specific conventional compounding ingredients useful in conjunction with the different thermoplastic resin materials form no part of the invention and are known to the art.

In the case of polyvinyl chloride, the following compounding ingredients are preferably employed in the calendering step of this invention: plasticizers including dioctyl phthalate, tricresyl phosphate and polymeric esters; pigments, including titanium dioxide, carbon black, lead chromate, and the like; stabilizers including lead silicate, lead stearate, cadmium-barium soaps, and the like.

This invention finds particular applicability to the fabrication of laminates from sheet metal and polyvinyl chloride containing conventional compounding ingredients, such as those above listed.

In the practice of the invention as applied to the fabrication of embossed polyvinyl chloride-sheet metal laminates, it is preferable to calender the polyvinyl chloride material together with the desired compounding agents to form a polyvinyl chloride sheet material having throughout a substantially uniform temperature of about 350° F. to about 380° F., emboss the so-formed polyvinyl chloride sheet while still hot from the calendering step and before the sheet has cooled to a temperature below about 330° F., cool the embossed polyvinyl chloride sheet, and press the embossed polyvinyl chloride sheet to a metal surface preheated to a temperature of at least about 300° F. but at substantially lower than the temperature at which the polyvinyl chloride sheet was embossed, said metal surface bearing an adhesive activated under the conditions, and cool the laminate so produced.

In a preferred embodiment of the invention, the polyvinyl chloride starting material is calendered to produce a sheet having throughout a uniform temperature of about 360° F. to about 370° F., which is embossed at a temperature of from about 340° F. to about 360° F. and while still hot from the calendering operation.

In the practice of the invention as applied particularly to polyvinyl chloride, the embossed polyvinyl chloride sheet preferably is cooled, for example, to a temperature of about 60° F. to 120° F., and thereafter laminated to a metal surface preheated to a temperature of about 340° F. to about 350° F., but in any event, at least about 10 degrees lower than the temperature at which the polyvinyl chloride sheet is embossed.

The practice of the invention is schematically illustrated in the figure which shows a mass 1 of thermoplastic resin material such as polyvinyl chloride which is passed through conventional calender rolls 2 to form a sheet 3 which is provided with a desired physical surface finish by an appropriate design roll such as embossing roll 4 positioned closely adjacent the calender rolls 2.

The embossed sheet is cooled after passage through the embossing rolls to a temperature substantially below the embossing temperature by exposure to the atmosphere. The so-cooled sheet is then contacted at 5 with a sheet of metal 6 preheated at 7, for example, by infrared heating means to a temperature substantially below the embossing temperature. The metal sheet 6 carries an adhesive 8 which is activated under the conditions. The metal sheet 6 and the thermoplastic resin sheet 3 having the desired surface finish are laminated by conventional pressure laminating rolls 9 to provide the desired laminate 10. There is also shown in the drawing rotogravure printing rolls 11 and 12 which may be employed, alternatively or simultaneously, to apply a printed design to either or both surfaces of the cooled, surface finished sheet 3. Such rotogravure rolls are employed only when printed thermoplastic sheets are desired. The invention, of course, contemplates the lamination of unprinted resin sheets.

Example I

Approximately 75 parts by weight of a particulate, commercially produced, polyvinyl chloride having a molecular weight of about 30,000 to 100,000 are compounded in a rubber mill with the following compounding agents in the proportions indicated.

11 parts polymeric ester plasticizer
11 parts dioctyl phthalate
2 parts cadmium-barium laurate stabilizer
1 part triphenyl phosphite The compounded polyvinyl chloride composition was then formed into a sheet having a thickness of about .020 inch and having a uniform temperature throughout of about 365° F. in a conventional calender. The so-formed sheet was passed through embossing rolls at a temperature of about 360° F. and while still hot from the calendering operation. The so-embossed sheet was then cooled to a temperature of about 80° F. and thereafter laminated under a pressure of about 10 lbs. p. s. i. with sheet aluminum of about .020 inch thick preheated to a temperature of about 350° F., and bearing an activated thermoplastic adhesive.

The adhesive was formed on the aluminum sheet by repeated spraying of the sheet with a composition containing the following materials in the proportions indicated:

| | Percent by wgt. |
|---|---|
| Vinyl chloride-acetate copolymer resin | 24.50 |
| Alkyd type ester of balsamic rosin sold by Hercules Powder Co. as "Neolyn 23" | 7.00 |
| Dioctyl phthalate | 3.50 |
| Toluol | 32.50 |
| Methyl ethyl ketone | 16.25 |
| Methyl isobutyl ketone | 16.25 |

The solvent was volatilized after each spraying of the metal surface. The thickness of the adhesive on the metal surface after volatilization was built up to about 1 mil by a series of three spraying operations.

The laminate was cooled and it was found that the embossed pattern in the polyvinyl chloride lamina had not faded or otherwise deteriorated in the fabricating process. The laminate so-formed had a bond strength in excess of 20 lbs. per linear inch.

The product is useful in the fabricating of cabinets for air-conditioners, business machines, chemical resistant ductwork, wall panels, interior auto trim, shipping containers for chemicals, switch boxes and the like.

Example II

The process of Example I was repeated with the exception that in this instance the polyvinyl chloride was compounded in the calendering operation with the following compounding agents:

75 parts vinyl chloride-acetate copolymer
11 parts tricresyl phosphate
11 parts polymeric ester ("Paraplex" plasticizers sold by Rohm and Haas Company, and apparently an ester derived from palm nut oil acids and polymerized to form a long chain molecule)
2 parts lead silicate
1 part lead stearate A laminated product of properties similar to that described in Example I was obtained.

Example III

The process of Example I was repeated with the exception that there was employed in lieu of embossing rolls, rolls effective to impart a light matte physical surface finish to the thermoplastic sheet material hot from the calender. After the matte finished sheet had cooled, a simulated wood grain finish was applied thereto as by the rotogravure printing roll 11, using conventional ink, shown in Figure 1. The matte finish printed thermoplastic resin sheet was then laminated with sheet metal bearing an adhesive active under the conditions, in the same manner as described in Example I, to produce a finished laminated structure having the natural wood finish.

Example IV

The process of Example I was repeated with the exception that in this instance the adhesive employed contained about 5 parts by weight of a modified rosin compound, sold by the Hercules Powder Company under the trademark "Neolyn 23." Also in this example, approximately 2 parts of the same modified rosin were compounded with 98 parts of polyvinyl chloride sheet material in the calendering step.

A product similar to that described in Example I was obtained. In this instance, however, the laminating was effected at a temperature of about 300° F.

Example V

The process of Example I is repeated with the exception that in this instance the polyvinyl chloride sheet is calendered at a temperature of 330° F. and thereafter laminated under pressure with sheet aluminum, of the type described in Example I, and preheated to a temperature of about 225° F.

A product similar to that described in Example I is obtained.

Example VI

The process of Example I is repeated with the exception that in this instance the polyvinyl chloride sheet is embossed while at a uniform temperature of about 380° F.

A product similar to that described in Example I is obtained.

Example VII

The process of Example I is repeated with the exception that in this instance the thickness of the adhesive was built up to about 1.2 mils.

A product similar to that produced by Example I is obtained.

Example VIII

The process of Example I is repeated with the exception that in this instance a vinyl chloride-vinyl acetate copolymer is employed.

Analogous results to those described in Example I are obtained.

Example IX

The process of Example I is repeated with the exception that in this instance a vinylidene chloride polymer is employed with analogous results.

This application is a continuation-in-part of application Serial No. 500,148, filed April 8, 1955.

I claim:

1. The process which comprises heating substantially uniformly throughout its thickness a sheet of thermoplastic resinous material to a temperature of about 300° F. to about 400° F., physically treating the so-formed sheet while said sheet is still hot from the heating step and before the sheet has cooled to a temperature below about 275° F. to impart thereto a physically modified surface finish, cooling the surface finished sheet, pressing the surface finished sheet, with the physically modified surface exposed, to a metal surface preheated to a temperature of at least about 225° F., but substantially lower than the temperature at which the sheet was finished, said metal surface bearing an adhesive composition activated under the conditions, and cooling the laminate so-formed.

2. The process of claim 1 wherein the thermoplastic resinous material is selected from the group consisting of polyvinyl acetate, polyvinyl chloride, polyvinylidene chloride, polyvinyl butyral, polyethylene, polystyrene, halogenated rubber, cellulose acetate, cellulose nitrate, vinyl acetate-vinyl chloride copolymers, and vinyl acetate-vinylidene chloride copolymers.

3. The process of claim 1 wherein the thermoplastic resinous material comprises polyvinyl chloride.

4. The process of claim 1 wherein the metal surface is an aluminum surface.

5. The process of claim 1 wherein the metal surface is steel.

6. The process of claim 1 wherein the surface finish formed on the sheet of thermoplastic resinous material is a matte finish.

7. The process of claim 6 wherein a design is printed on said matte finish prior to lamination with said metal.

8. The process for producing a sheet thermoplastic resin-sheet metal laminate which comprises calendering a thermoplastic resin to form a thermoplastic resinous sheet having throughout a substantially uniform temperature of about 330° F. to about 380° F., physically treating the so-formed sheet while said sheet is still hot from the calendering step and before the sheet has cooled to a temperature below about 300° F. to impart thereto a physically modified surface finish, cooling the surface finished sheet, pressing the surface finished sheet, with the finished surface exposed, to a sheet metal surface preheated to a temperature of at least about 225° F. but substantially lower than the temperature at which the thermoplastic sheet was surface finished, said surface bearing an adhesive activated under the conditions, to form a laminate having a cold bond strength between the thermoplastic lamina and the sheet metal lamina of at least about 20 lbs. per linear inch.

9. The process for producing a sheet polyvinyl chloride-sheet metal laminated structure which comprises calendering the polyvinyl chloride to form a polyvinyl chloride sheet having throughout a substantially uniform temperature of about 350° F. to about 380° F., physically treating the so-formed sheet while said sheet is still hot from the calendering step and before the sheet has cooled to a temperature below about 330° F. to impart thereto a physically modified surface finish, cooling the surface finished sheet, pressing the surface finished sheet, with the finished surface exposed, to a metal surface preheated to a temperature of at least about 300° F., but substantially lower than the temperature of the polyvinyl chloride sheet in the surface finishing step, said sheet metal surface bearing a thermoplastic adhesive activated under the conditions, and cooling the resulting laminated structure.

10. The process of claim 9 wherein the polyvinyl chloride material is calendered to form a sheet having throughout a substantially uniform temperature of about 360° F. to about 370° F., wherein the so-formed sheet is physically treated at a temperature from about 350° F. to about 370° F., and wherein the sheet metal surface bearing the heat activated adhesive is preheated to a temperature of about 350° F.

11. The process of claim 9 wherein the adhesive comprises from about 20% to about 30% by weight of a vinyl chloride-vinyl acetate copolymer, from about 2% to about 5% by weight of dioctyl phthalate, from about 30% to about 35% by weight of aromatic hydrocarbons, and from about 24% to 36% by weight of low molecular weight aliphatic ketones.

12. The process of claim 9 wherein the adhesive carried by the preheated metal surface is from about 0.5 to about 1.5 mils in thickness.

13. The process of claim 9 wherein the adhesive carried by the preheated metal surface is from about 0.9 to about 1.1 mils in thickness.

14. The process which comprises heating substantially uniformly throughout its thickness a sheet of thermoplastic resinous material to a temperature intermediate the softening point and the melting point thereof, physically treating the so-heated sheet to impart thereto a physically modified surface finish, said treating step being carried out at a temperature at which said resin has a viscosity sufficient to retain said surface finish, cooling the surface finished sheet to a temperature substantially below the surface finishing temperature and laminating the cooled, surface finished sheet with sheet metal preheated to a temperature of at least 100° F., but substantially below the surface finishing temperature of said sheet, said preheated sheet metal bearing an adhesive activated under the conditions, and thereafter cooling the laminate thus formed to produce a laminated product in which said modified surface finish of the resin sheet is not materially altered.

15. The process for producing a sheet thermoplastic resin-sheet metal laminate which comprises forming from a mass of thermoplastic resin a thermoplastic resinous sheet substantially uniformly heating said sheet throughout its thickness to a temperature of from about 300° F. to about 400° F., embossing the so-formed sheet while still hot and before the sheet has cooled to a temperature below about 275° F., cooling the embossed sheet, pressing the embossed sheet to a sheet metal surface preheated to a temperature of at least about 225° F. but substantially lower than the temperature at which the thermoplasic sheet was embossed, said surface bearing an adhesive activated under the conditions, to form a laminate having a cold bond strength between the thermoplastic lamina and the sheet metal lamina of at least about 20 lbs. per linear inch.

16. In a process for forming a laminate comprising a sheet metal lamina and a thermoplastic resin sheet lamina bonded together by means of a heat activatable resin, a surface of said resin lamina having been physically treated to impart thereto a desired physically modified surface finish while at a temperature of at least about 275° F. but at which the resin is of a viscosity sufficient to retain said modified surface finish, the improvement which comprises heating said sheet metal lamina to a temperature substantially below that at which said surface was modified, forming a sandwich of the said heated metal sheet, said heat activatable adhesive and said resin, under conditions to form the laminate, the temperature of lamination being sufficient to activate said adhesive but being substantially lower than the temperature at which said resin surface was modified, and thereafter cooling the laminate thus formed to produce a laminated product in which said modified surface finish of the resin sheet is not materially altered.

17. The process of claim 16 wherein the resin sheet has been embossed.

18. The process of claim 16 wherein said resin sheet has been matte finished.

19. The process of claim 16 wherein said resin sheet has been polished.

20. The process of claim 16 wherein the laminated sheet is rendered dimensionally stable by annealing at a temperature substantially below the temperature at which the thermoplastic resin sheet was surface finished.

21. The process of claim 16 wherein the thermoplastic resinous material is selected from the group consisting of polyvinyl acetate, polyvinyl chloride, polyvinylidene chloride, polyvinyl butyral, polyethylene, polystyrene, halogenated rubber, cellulose acetate, cellulose nitrate, vinyl acetate- vinyl chloride copolymers and vinyl acetate vinylidenechloride copolymers.

22. The process of claim 14 wherein the physically treating step is carried out at a temperature of at least about 275° F.

23. The process of claim 14 wherein the sheet metal surface is preheated to a temperature of at least about 225° F.

24. The process of claim 14 wherein the sheet metal surface is preheated to a temperature of at least about 225° F. but to a temperature at least 10° lower than the temperature at which said resin sheet was surface finished.

25. The process of claim 16 wherein the sheet metal surface is preheated to a temperature of at least about 225° F. but to a temperature at least 10° lower than the temperature at which said resin sheet was surface finished.

References Cited in the file of this patent

UNITED STATES PATENTS

| | | |
|---|---|---|
| 2,446,771 | Knowland | Aug. 10, 1948 |
| 2,585,915 | Chavannes | Feb. 19, 1952 |
| 2,719,564 | Schneider | Oct. 4, 1955 |
| 2,728,703 | Kiernan et al. | Dec. 27, 1955 |